United States Patent [19]
Martin et al.

[11] Patent Number: 5,225,229
[45] Date of Patent: Jul. 6, 1993

[54] ALUMINUM HYDROXIDE PRODUCTION

[75] Inventors: Edward S. Martin, New Kensington; Mark L. Weaver, Allison Park, both of Pa.; John E. Marhanka, Benton, Ark.; Alan Pearson, Murrysville; Masaki Madono, Pittsburgh, both of Pa.

[73] Assignee: Aluminum Company of America, Pittsburgh, Pa.

[21] Appl. No.: 601,654

[22] Filed: Mar. 5, 1990

[51] Int. Cl.$^5$ .......................... C01F 7/02; C01F 7/42
[52] U.S. Cl. .................................. 423/629; 423/625; 423/627; 423/628
[58] Field of Search .............. 423/629, 625, 627, 628, 423/127

[56] References Cited

U.S. PATENT DOCUMENTS

| | | | |
|---|---|---|---|
| 2,405,275 | 8/1946 | Stowe | 423/127 |
| 2,733,219 | 1/1956 | Bloch | 423/627 |
| 3,488,147 | 1/1970 | Keith et al. | 423/627 |
| 3,494,733 | 2/1970 | Keith et al. | 423/627 |
| 3,655,339 | 4/1972 | MacZura et al. | 423/625 |
| 3,899,568 | 8/1975 | Frick et al. | 423/55 |
| 4,019,914 | 4/1977 | Esper et al. | 106/62 |
| 4,051,222 | 9/1977 | Gnyra | 423/127 |
| 4,175,118 | 11/1979 | Wassermann et al. | 423/628 |
| 4,568,527 | 2/1986 | Anjier et al. | 423/127 |
| 4,582,697 | 4/1986 | Cristol et al. | 423/629 |
| 4,585,645 | 4/1986 | Sucech | 423/625 |
| 4,595,581 | 6/1986 | Misra et al. | 423/625 |
| 4,595,665 | 6/1986 | Takayama et al. | 501/128 |
| 4,657,754 | 4/1987 | Bauer et al. | 423/625 |
| 4,666,687 | 5/1987 | Chantriaux et al. | 423/127 |
| 4,755,374 | 7/1988 | Martin et al. | 423/627 |
| 4,822,593 | 4/1989 | Wilhelmy | 423/629 |
| 4,847,064 | 7/1989 | Pearson | 423/625 |

FOREIGN PATENT DOCUMENTS

| | | |
|---|---|---|
| 0168606 | 1/1986 | European Pat. Off. . |
| WO900523 | 1/1990 | PCT Int'l Appl. ................. 423/629 |
| WO901577 | 12/1990 | PCT Int'l Appl. . |

OTHER PUBLICATIONS

Schmah, V. H. "Finfache Darstellung von gut durchgebiddetem Bayerit" Naturforschg, 1946 pp. 323-324.

Alcoa "Hydrated Alumina" publicity publication pp. 9-10.

Suwa, Yoshiko et al., "Lowering Crystallization Temperatures by Seeding in Structurally Diphasic Al$_2$O$_3$–MgO Xerogels", J. Am. Ceram. Soc., 68 [9] (1985), pp. 238-240.

Kumagai, Masato et al., "Controlled Transformation and Sintering of a Boehmite Sol-Gel by α-Alumina Seeding", J. Am. Ceram. Soc., 68 [9] (1985), pp. 500-505.

Lussy, Edward W., "Experience with Operation of the Alcoa Fluid Flash Calciner", Light Metals, (1980), pp. 69-79.

Wefers et al., "Oxides and Hydroxides of Aluminum", Alcoa Technical Paper No. 19, Revised, (1987), pp. 36-37.

Chemical Week, Jun. 1, 1977, pp. 35-36.

Edward et al., The Aluminum Industry, vol. 1, 1st Ed., McGraw Hill, New York (1930), pp. 164-167.

Primary Examiner—John Niebling
Assistant Examiner—Brian M. Bolam
Attorney, Agent, or Firm—Douglas P. Mueller; Daniel A. Sullivan, Jr.

[57] ABSTRACT

A method for the production of aluminum hydroxide, including reacting water in the liquid phase and aluminum at a pH above about 12.4. In this pH range, aluminum hydroxide is produced at acceptable rates both for aluminum surface areas above 75,000 mm$^2$/g and for aluminum surface area of less than about 50,000 mm$^2$ per gram, and even down to 20 mm$^2$ per gram. According to an alternative view of the invention, it is characterized by the production of aluminum hydroxide by reacting aluminum with liquid water containing choline. Aluminum hydroxide particles having unique morphologies are obtained.

14 Claims, 3 Drawing Sheets

ALUMINUM HYDROXIDE PRODUCTION

This application is a continuation-in-part under 35 USC 365(c) of PCT/US88/02186 filed Jul. 15, 1988, which is a continuation-in-part of U.S. Ser. No. 887,000 filed Jul. 18, 1986 (now U.S. Pat. No. 4,755,374), and PCT/US89/02659 filed Jun. 19, 1989, which is a continuation-in-part of U.S. Ser. No. 137,159 filed Dec. 23, 1987 now U.S. Pat. No. 4,847,064.

BACKGROUND OF THE INVENTION

This invention relates to the production of aluminum trihydroxide.

U.S. Pat. No. 3,494,733 of Keith and Cornely, issued Feb. 10, 1970, for "Method for the Production of Alumina Trihydrate Dominant in Bayerite" emphasizes a "discovery that aluminum metal of high surface area and in a very fine state of subdivision, can be reacted with water at a basic pH to yield a predominantly trihydrate alumina without the need for extensive aging." As to the high surface area and very fine state of subdivision, Keith and Cornely state that the aluminum particles used in their process should have surface area lying in the range 75 thousand to 1 million square millimeters/gram.

Others have experimented with the reaction of aluminum metal with high pressure steam. See Tremper and Gordon, "Agglomeration Effects on the Sintering of Alumina Powders Prepared by Autoclaving Aluminum Metal" in "Ceramic Processing Before Firing", Onoda and Hench, pp. 153-76, John Wiley & Sons, N.Y. (1978).

SUMMARY OF THE INVENTION

It is an object of the invention to provide a method for the production of aluminum hydroxide overcoming certain disadvantages of the process of Keith and Cornely. This as well as other objects which will become apparent in the discussion that follows are achieved, according to the present invention, by providing a method for the production of aluminum hydroxide, including reacting water in the liquid phase and aluminum at a pH above about 12.4. In this pH range, aluminum hydroxide is produced at acceptable rates both for aluminum surface areas within the range required by Keith and Cornely and for aluminum surface area of less than about 50,000 mm$^2$ per gram, and even down to 34, or even 20, mm$^2$ per gram. According to an alternative view of the invention, it is characterized by the production of aluminum hydroxide by reacting aluminum with liquid water containing a non-metallic base, preferably choline.

Nomenclature as used herein for aluminum hydroxides is according to FIG. 1 in the article entitled "Aluminum Oxide" in the 5th edition of Ullmann's Encyclopedia of Industrial Chemistry. The term "trihydrate alumina" as used by Keith and Cornely is aluminum trihydroxide in the system of Ullmann's FIG. 1. Unless noted otherwise, percentages herein are percentages by weight.

DESCRIPTION OF THE PREFERRED EMBODIMENTS

In the present invention, aluminum hydroxide is produced, as in Keith and Cornely, by the reaction of water with aluminum metal. An attraction of producing aluminum hydroxide in this way lies in the fact that aluminum metal of very high purity is available in the marketplace at reasonable prices as compared to the cost of obtaining similar purity aluminum hydroxide by direct production from bauxite.

The process of Keith and Cornely is, however, disadvantageous from a number of points of view—for instance from the point of view of product contamination when one uses one of their suggested materials containing sodium or chlorine, for example, or from the point of view of ability to react the aluminum, particularly aluminum of larger particle, or piece, size. Keith and Cornely teach in their above-cited 3,494,733 that the aluminum metal must have high surface area and a very fine state of subdivision; it should have surface area lying in the range 75 thousand to 1 million square millimeters per gram. The difficulty in obtaining reaction is treated in another U.S. patent of Keith and Cornely, namely U.S. Pat. No. 3,488,147.

Figure 1:
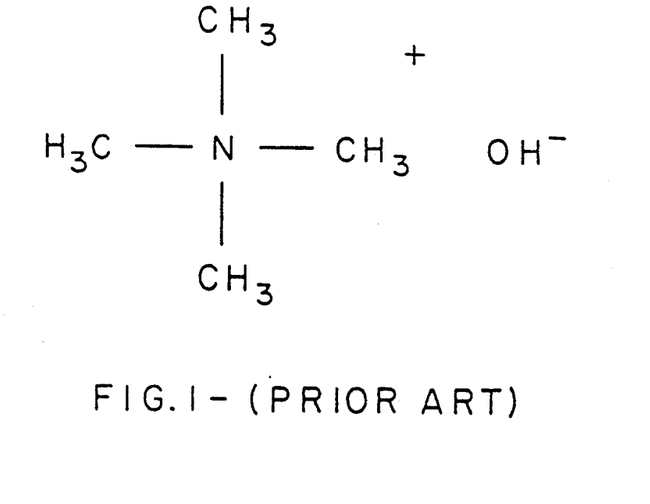
FIG. 1 depicts the structural formula of tetramethylammonium hydroxide.
Figure 2:
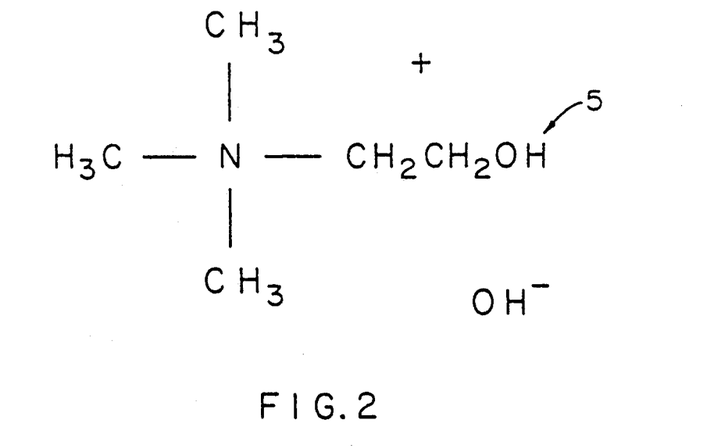
FIG. 2 depicts the structural formula of choline.

These disadvantages of the process of Keith and Cornely are overcome in the present invention through the use of choline as an added material and through the use of higher pH—above about 12.4. The closest Keith and Cornely come to choline as an added material is tetramethylammonium hydroxide, whose structure is as shown in the FIG. 1 attached hereto. This is Keith and Cornely's example of a lower alkyl amine (claim 7 of 3,494,733). Choline is quite different, because one of the groups attached to the quaternary nitrogen is not alkyl but rather —CH$_2$CH$_2$-OH. See the structure of choline as presented in the attached FIG. 2.

In terms of pH, Keith and Cornely recommend a basic pH up to only about 12.

Important for the success of aluminum dissolving additives such as the chemicals suggested by Keith and Cornely and the choline used in the present invention is that their aluminates must be soluble.

Only then is a cyclic digest possible, wherein the additive is recycled for reuse in the production of more aluminum hydroxide. Formation of insoluble aluminates would make the process uneconomic, by consuming the additive. The presence of the covalently bonded OH at location 5 in FIG. 2 would indicate a non-soluble aluminate (the presence of —CH$_2$-CH$_2$-OH would cause the aluminate to be insoluble due to strong interaction between the covalent OH and the Al$^{3+}$ ion), but we have found, to the contrary, that such does not, in fact, occur.

Choline concentrations of about 0.05 to 2 mole per liter (M) are effective for promoting the reaction of water and aluminum metal according to the present invention. The range of 0.05 to 1 mol per liter is preferred when ceramic aluminas are the desired end product. Higher choline concentrations yield products having morphologies suitable, for example, for sorbent applications, as discussed below. Concentrations above about 2.0 M are not preferred, as decreased reaction rates seem to be found at such concentrations. The lower end of this concentration range causes a pH of about 12.7, and pH rises to above 13 as one exceeds around 0.1 M. In contrast, the pH used in Example IV of Keith and Cornely's 3,494,733 (their Example IV is the example where tetramethylammonium hydroxide is used) is 9.5, this indicating a tetramethylammonium hydroxide concentration in the neighborhood of $3.2 \times 10^{-5}$ M.

Interestingly, a relationship between choline concentration and the resulting predominant form of aluminum hydroxide has been found, lower concentrations giving bayerite and higher concentrations giving gibbsite. Thus, low concentrations of about 0.05 M choline yields predominantly bayerite, while concentrations of 0.5 M and above yield all gibbsite. This we know to be true between 22° and 75° C. Gibbsite is desirable for production of ceramic aluminas. The ability to select crystal phase by adjustment of choline concentration gives much more flexibility than in 3,494,733. See particularly the comment in 3,494,733 on temperature influence on phase at its column 4, lines 16-24.

Temperature of the aqueous solution used in the invention is preferably kept above about 40° C., in order to prevent scale adhesion on the aluminum metal being reacted. The temperature also is preferably kept relatively low, for example in the range of about 40° C. to 70° C., preferably about 50° C., which results in a final product of improved translucency.

It is advantageous to stir the liquid in the reaction vessel. Stirring provides intimate contact of metal and solution and maintains a homogenous concentration in the solution. The stirring need not be so vigorous as blender, or high shear, mixing. Stirring reduces scale adhesion on the vessel containing the reactants. Stirring also enhances autoprecipitation, i.e., precipitation without any need for seeding.

However, the use of a promoter material, particularly a submicron-sized alpha alumina, provides certain advantages. A reaction mixture to which alpha alumina promoter has been added, for example in an amount of about 0.01-10% by weight based on the amount of equivalent alpha alumina in the precipitate obtained, preferably about 0.01-5%, more preferably about 0.01-1%, yields a precipitate containing mixed hydrate (Gibbsite) and alpha alumina crystals. These amounts correspond to about 0.1 to 100 g/l, 0.1 to 50 g/l and 0.1 to 10 g/l, respectively. Advantages flowing from this mixed precipitate include lower temperatures for converting the Gibbsite to alpha alumina, with correspondingly smaller alpha alumina crystallites and improved grindability. Also, the calcined final product from precipitation in the presence of an alpha alumina promoter shows improved translucence, especially when coupled with the lower precipitation temperature discussed above. These advantages can be obtained in the presence of dissolving additives other than choline in the reaction mixture.

The promoter material should be of high purity, but need only be pure enough to meet the purity requirements of the final product. Examples of maximum impurity limits are 100 ppm $SiO_2$, 50 ppm $Na_2O$, 30 ppm $Fe_2O_3$ and 50 ppm total for any remaining impurities. The promoter material should generally be submicron in size. Material having a median particle size of about 0.5 μ is suitable. For example, a suitable material may have a particle size distribution with a d90 value of 1.66μ, a d50 value of 0.54μ and a d10 value of 0.33μ, as tested on a Micromeritics Sedigraph ®. The d90, d50 and d10 values are points on the particle size distribution curve at which, respectively, 90, 50 and 10% of the material is finer than the stated particle size. For instance, 90% of the particles have diameters smaller than the d90 value of 1.66μ.

Precipitation also can be carried out in the presence of an aluminum hydroxide seed. Although the aluminum metal dissolves in the choline solution readily enough to drive the precipitation so that the aluminum hydroxide seed is not necessary for the precipitation, some advantages in the form of improved particle size control may arrive from use of the seed.

While the invention works well for aluminum metal of relatively high surface area, as demonstrated by Examples I to IV below, it is still quite successful with aluminum of lower surface area, even at surface areas of less than 400 mm$^2$/g, as demonstrated by the remaining examples. The ability to use coarser aluminum metal is important from a safety point of view, since danger of explosion increases with increasing surface area. The ability to use coarser metal, e.g., less than 400 mm$^2$/g, is also important from the point of view of purity of the aluminum hydroxide product; this is true, because the atomization process for making powdered aluminum gives the opportunity for impurities to come into the metal that were not in the aluminum to begin with.

Reaction time is in general 4 to 6 hours, with up to two days being required for very coarse metal. The longer reaction times for the coarser metal is not necessarily of disadvantage, since coarser metal is cheaper and batch operation permits one to simply load the reactants into a vessel and permit the reaction to go to completion. Continuous operation is, of course, also possible.

As to purity, the purer the aluminum metal, the purer the aluminum hydroxide product. U.S. Pat. No. 4,115,215 shows the production of aluminum metal of 99.99% (referred to as "4-9's") purity, and metal of that purity can be purchased. In fact, 5- and even 6-9's purity aluminum is readily available on the market. A process based on the decomposition of organic compounds containing aluminum is said to yield 7-9's purity aluminum.

Besides attention being given to the aluminum metal, impurities can also result from contaminants in the water and the choline. Deionized, or perhaps double-deionized, and distilled water is suitable. Depending on the end use of the aluminum hydroxide, different impurities are of concern to different end uses. Iron and copper impurities in the aluminum are disadvantageous to the invention, because these impurities retard the aluminum-water reaction.

The aluminum hydroxide product of the invention will, in general, have an average particle size of at least about 1 micron, preferably about 4 to 12 microns, with higher choline concentrations giving the larger average particle sizes.

Aluminum hydroxide produced according to the present invention can be calcined to produce high purity alumina useful, for example, in the manufacture of high intensity sodium vapor discharge lamps. Aluminum hydroxide precipitated in the presence of an alpha alumina promoter as discussed above can be calcined to form alpha alumina at lower temperatures, for example less than 1100° C., preferably about 1050° C. Any remnant choline is driven off or destroyed in the calcination, and other impurity concentrations can be reduced, depending on their vapor pressures or the vapor pressures of their oxides.

Other uses for the calcined product of the invention are as polishing compound, in cutting tools, in bioceramics, in electronic substrates, synthetic jewels, watch covers, special windows (such as the window of the bar-code readers of checkout counters), encapsulating lids of various types, etc.

Freedom from the alkali metal contamination characterizing aluminas directly made from Bayer process aluminum trihydroxide makes the aluminum hydroxide product of the present invention suitable for preparation of activated (transition) alumina catalyst supports.

Naturally, there are a number of areas of application where purity does not have to be greater than 99.5% where the invention can as well be applied.

Further illustrative of the invention are the following examples:

EXAMPLE I

A solution of choline in water was made using Eastman practical grade 45% choline in methanol to yield a solution concentration of 0.05 mols choline per liter of solution. The solution was brought to a temperature of 40° C. and stirred using an air stirrer. While maintaining stirring, 40.5 grams of aluminum powder, namely Alcoa High-Purity Atomized Powder Grade 7123 powder (minimum aluminum content of 99.97%) having an average particle size of 17 microns and a surface area of 250,000 mm$^2$/gm, first mixed with a small amount of deionized water to guard against dusting, was mixed with the choline solution. The 40.5 grams of aluminum provided a metal concentration of 2 mols per liter of choline solution. The aluminum reacted with the water and hydrogen was evolved. The temperature rose to 81°-86° C. and was maintained there by cooling water circulated through stainless steel tubing immersed in the solution. The mixture was allowed to react until hydrogen evolution ceased. After another period amounting to about $\frac{1}{3}$ the amount of time to cessation of hydrogen evolution, the reaction mixture was filtered using Watmann No. 42 filter paper to collect an aluminum hydroxide product of about 5 to 10 microns particle size. Total reaction time (to hydrogen evolution cessation + $\frac{1}{3}$) was 3.83 hours. X-ray diffraction analysis of the product showed a major portion of bayerite with a probable minor portion of boehmite.

Table I presents a summary of the experimental conditions used for this example. Table IV presents the types of aluminum hydroxide detected by X-ray diffraction analysis.

EXAMPLE II

The purpose of this example was to determine the effect of solution metal concentration. Procedure was as in Example I, except that 101.1 grams of aluminum was used, this amounting to a metal concentration of 5 mols per liter of choline solution. Temperature control became more difficult (the larger amount of aluminum resulted in increased heat evolution), as evidenced by the greater temperature range in Table I. However, the process, as embodied in this Example, is still well within the capabilities of any of a multitude of temperature control techniques familiar to chemical engineers. Aluminum hydroxide types recovered were as presented in Table IV.

EXAMPLES III-IV

The purpose of these examples was to determine the effect of lower operating temperature. Procedure was as in Examples I and II, except that temperature was controlled to the region around 60°. Experimental conditions and results were as displayed in Table I. Aluminum hydroxide types recovered were as presented in Table IV.

EXAMPLES V-VII

In these examples, a granular aluminum metal of lower surface area was used to provide an idea of the effect of surface area, by comparison with Examples I-IV. The metal measured 99.7% Al in purity. Choline concentration was also varied, to develop an indication of its effect on reaction time. Procedure was as in Example I, with parameter and result differences as noted in Table II. In Examples V and VI, 61 grams of aluminum were charged, and the experiments were stopped before complete reaction. In Example VII, all of the aluminum charged was reacted. Aluminum hydroxide types recovered were as presented in Table V.

EXAMPLE VIII

In this example, aluminum flake (or, perhaps more correctly stated, pebbles) of 99.99% purity and still lower surface area was used. The pebbles are a product of Aluminum Company of America bearing the designation "Alcoa Granulated Ingot", Product Code No. 1301. In this case, unlike Examples I-VII, the reactor was a packed-bed-type formed by the pebbles in a vertical tube of 1½-inch internal diameter and 18-inches height. Choline solution circulated upflow through the bed, at a 1 liter per minute flow rate, 5 cm/sec average flow velocity, to provide the contact achieved by stirring in Examples I-VII. Hydrogen gas was vented at the top of the tube. The choline solution was circulated into the bottom of the tube from a holding tank, brought off the top of the tube, and recirculated back to the holding tank. The holding tank was sufficiently large that the aluminum hydroxide product coming from the top of the tube settled to the bottom of the tank, with the circulation to the bottom of the tube being from clarified solution above the bottom of the tank. Experimental conditions and results are presented in Tables II and V. Temperature was measured in the holding tank.

EXAMPLES IX-XIII

In these examples, aluminum surface area was further decreased. Solutions of choline in water were made as in Example I to yield solution concentrations as given in Table III. The solutions were brought to the temperatures indicated in Table III. Aluminum rods having initial dimensions of 9.3 mm diameter by 33 to 35 mm length were then added to the liquid and the liquid was stirred above the immersed rods. The rods were about 99.99% pure aluminum metal. Reaction times and weight of aluminum reacted were as given in Table III. Unlike Examples XX-III, there was no stirring in Example IX. Weight of aluminum hydroxide recovered, and the identity of the aluminum hydroxide - gibbsite - appears in Table VI.

EXAMPLE IXA

Example IX was varied as follows: Instead of a stagnant solution, the solution was continuously stirred. The surface area of the aluminum was 335 mm$^2$/gram.

For a charge of 25.1 grams, 2.56 grams of aluminum reacted in 6.5 hours. The weight of recovered aluminum hydroxide product was 6.34 grams, a little less than stoichiometric due to scale formation on the reactor walls. The product contained bayerite and nordstrandite.

EXAMPLES XIV-XXXII

Parameters for these examples are shown in Tables IIIA and IIIB.

The data in Tables IIIA show that there is no consistent difference in rate of the choline-water-aluminum reaction at 60° C. between choline solutions which contain methanol and those which do not. The methanol-free choline was prepared by passing choline chloride through a strong-base ion-exchange resin, Rexyn 201 of Fisher Scientific.

The data for these examples also shows that there is no consistent difference in the reaction rate between a magnetically stirred reactor and a larger mechanically stirred reactor.

The data in Tables IIIB show that the rate for 0.05 M choline is much slower than the rate for 0.125 M choline (a twelve-fold decrease, while the rate of sodium hydroxide attack varies as the square root of NaOH concentration; see GMELINS HANDBUCH DER ANORGANISCHEN CHEMIE, 8th Edition, Aluminum, Teil A, Abteilung I, Sys.-Nr. 35, p409, Verlag Chemie, Berlin 1934-35). The rate also falls when the choline concentration is 2.0 M, this being the same result seen for 2.0 M choline at 60° C.

Figure 3:
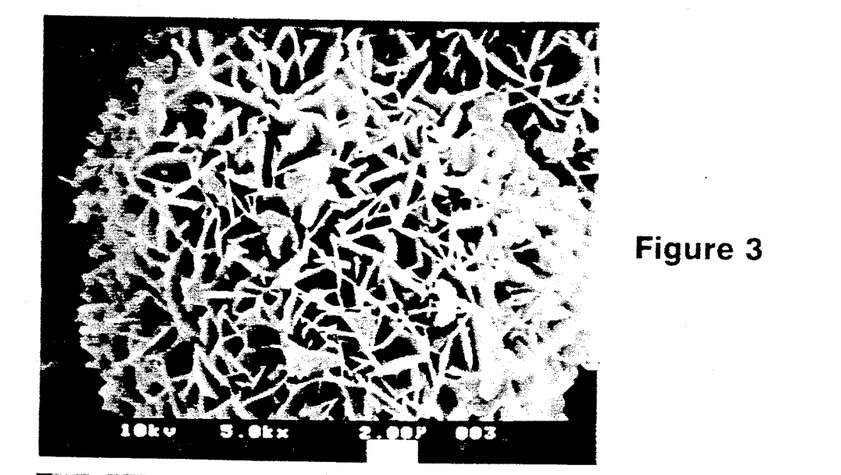
FIGS. 3, 4 and 5 are 5000x scanning electron micrographs of aluminum hydroxide particles of the present invention.
Figure 4:
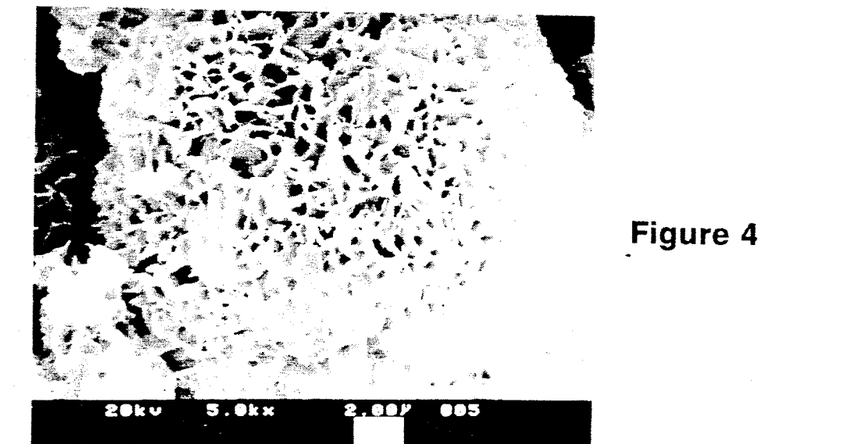
Figure 5:
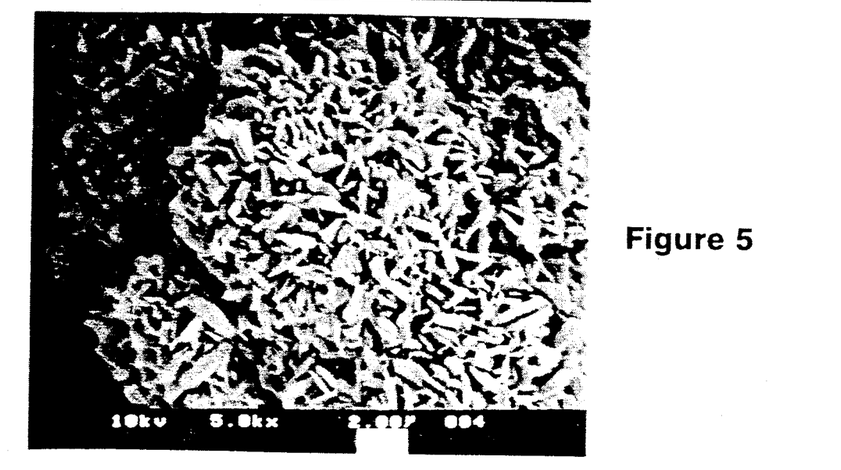

The aluminum hydroxide particles of the present invention, particularly those produced using a solution containing methanol as well as more than 1.0 M choline, show unusual morphologies, as seen in the examples of FIGS. 3,4 and 5. The sample of FIG. 3 was prepared with a choline concentration of 2.0 M, a reaction temperature of 75° C. and a reaction time of about 6.2 hrs, and has a surface area of about 32.2 $m^2$/gm and average pore diameter of about 227 angstroms (BET 4V/A). The sample of FIG. 4 was prepared with a choline concentration of 2.0 M, a reaction temperature of 60° C. and a reaction time of about 30 hours. The material has a surface area of about 40 $m^2$/gm. The sample of FIG. 5 was prepared with a choline concentration of 1.5 M, a reaction temperature of 60° C. and a reaction time of about 7.4 hours. The material has a surface area of about 21.1 $m^2$/gm and an average pore diameter of about 280.4 angstroms. In each case, the methanol concentration was about 4.6 times greater than the choline concentration. The surface areas and pore sizes were determined through BET nitrogen sorption analysis.

It can be seen from FIGS. 3-5 that the particles are formed from a plurality of randomly-oriented platelets, resulting in a sponge-like morphology. The platelets are about 0.1 to 0.3$\mu$ thick. The spacing and orientation of the platelets is such that the particles have a large number of "macro" openings about 0.05-2.5$\mu$, preferably about 0.1-1$\mu$ in size. The aluminum hydroxide particles have a surface area of at least about 1.5 $m^2$/gm, preferably at least about 5 $m^2$/gm, more preferably about at least 10 $m^2$/gm.

The aluminum hydroxide particles of the present invention may be calcined to form alumina particles. The calcining can be carried out at, for example, 400° to 800° C. A time of one to three hours is usually sufficient to ensure dehydroxylation. The lower calcining temperatures appear to provide higher surface areas as shown in Tables VII to X. The alumina particles generally have a surface area of at least 375 $m^2$/gm, preferably at least 425 $m^2$/m.

The morphologies of the aluminum hydroxide particles are retained in the alumina particles. With respect to crystal structure, the calcined particles assume the transition (i.e., chi, gamma, or mixtures thereof) alumina phases. As noted above the aluminum hydroxide particles of the present invention are substantially free from alkali metal (especially sodium) contamination. This benefit likewise is retained in the calcined particles. The amount of sodium in the aluminum hydroxide particles is less than 0.01% by weight, preferably less than 0.001%. Similar levels are found for sodium oxide in the calcined particles. The calcined particles also have a large number of relatively large pores, with at least about 30% being at least about 100 angstroms in diameter. The average pore diameter should be 100 angstroms or larger (as determined by the BET method), preferably at least 200 angstroms.

The high surface area range renders the alumina particles suitable for heterogenous catalyst support and absorbent applications. The large pore sizes are particularly useful in allowing transport of very high molecular weight compounds into and out of the pore structure. Such compounds include, for example, heavy compounds in petroleum, peptides and proteins in sorbent applications in biological systems, and synthetic polymers.

The aluminum hydroxide particles of this invention can be calcined to form alpha alumina, which in turn can be pressed and sintered. Particles formed at low choline concentrations are particularly useful in this regard. Examples of calcining to form alpha alumina are found in Table XI. Sample 21886-4 was prepared with 0.125 M choline and Sample 21886-6 with 0.50 M choline. In each case the reaction temperature was 60° C., with a reaction time of 30.4 hrs for the former and 24 hrs for the latter. The Alpha Alumina % column reflects the X-ray diffraction intensity of the samples as compared to that of Alcoa Standard SRPA 87. The results show that alpha alumina was produced.

The calcined product obtained can be sintered to form ceramics. For example, Al(OH)$_3$ produced in a 30 gallon reactor, 0.125 M choline, 75° C., was calcined for 4 hours at 1150° C., and the resulting alpha alumina was given a so-called "ACMA" grind, i.e., 4 kg of grinding balls and 125 gm of the alpha alumina at 62 rpm rotation rate in a 1.3 gallon mill. The ground product was pressed at 5000 psig to form a green body of 2.088 gm/cc density. The pressed alumina compact was then heated to progressively higher temperatures, finishing with one hour at 1540° C., providing an average fired density of 3.943 gm/cc, based on two samples, one 3.942, the other 3.994.

Thus, the material of the present invention can be sintered to high densities, i.e., greater than 3.9 gm/cc, using conventional techniques. This provides more efficiency in the sintering operation, allowing either the production of higher density material for given sintering conditions or the use of more economical conditions to provide a given density. Material formed from higher choline concentrations also can be sintered, although the "macroporous" structure of the material limits its use as a ceramic. Such sintered material can be used, for example, in high temperature insulation applications.

EXAMPLE XXXIII

Run 1- Aluminum hydrate is prepared by reacting 1000 g high purity aluminum metal in 10 liters of 1.4 M choline at 50° C. 20 g/l finely ground alpha alumina (d90-1.66μ, d50-0.54μ, d10-0.33μ) is added to the reaction mixture as the hydrate is precipitating. The resulting material is then dried, split into three batches, and the individual portions calcined for 2 hrs at 1050, 1150 or 1250° C.

Run 2 is identical to run except no alpha alumina promoter material is added during precipitation. The surface areas and alumina phase compositions obtained after calcining are as follows:

| Run 1- | 1050° C.- | 11.5 m²/g, 95% alpha alumina (trace kappa) |
|---|---|---|
|  | 1150° C.- | 6.7 m²/g, 100% alpha alumina |
|  | 1250° C.- | 4.0 m²/g, 100% alpha alumina |
| Run 2- | 1050° C.- | 40.4 m²/g, 100% kappa alumina |
|  | 1150° C.- | 6.6 m²/g, 98% alpha alumina |
|  | 1250° C.- | 4.6 m²/g, 100% alpha alumina |

It can be seen that the use of the promoter material allows essentially complete conversion to alpha alumina at 1050° C. with a correspondingly high surface area. Without the seed material, no alpha alumina is formed at 1050° C. At the higher calcining temperatures, little difference is observed between the seeded and unseeded runs, with all samples showing reduced surface area, i.e. coarsened alumina crystals.

Figure 6:
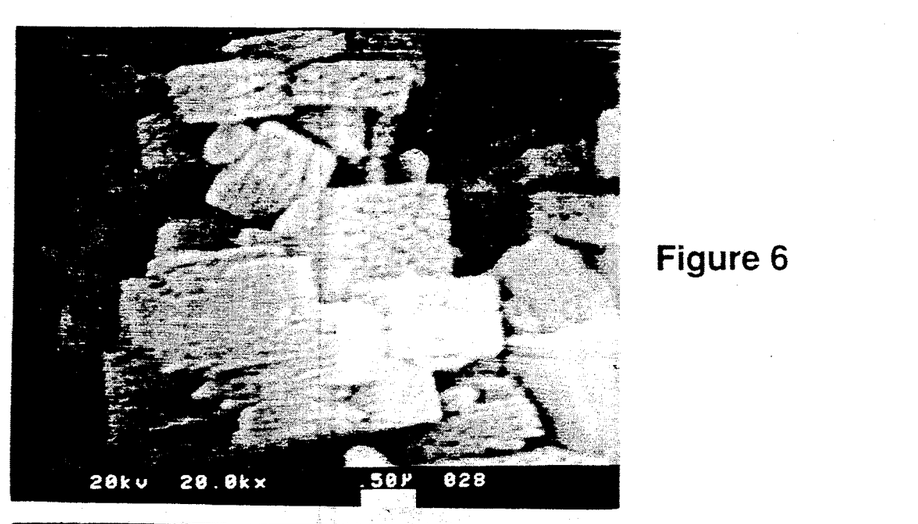
FIGS. 6 and 7 are 5000X scanning electron micrographs of alumina calcined from aluminum hydroxide particles precipitated respectively in the presence and absence of an alpha alumina promoter.
Figure 7:
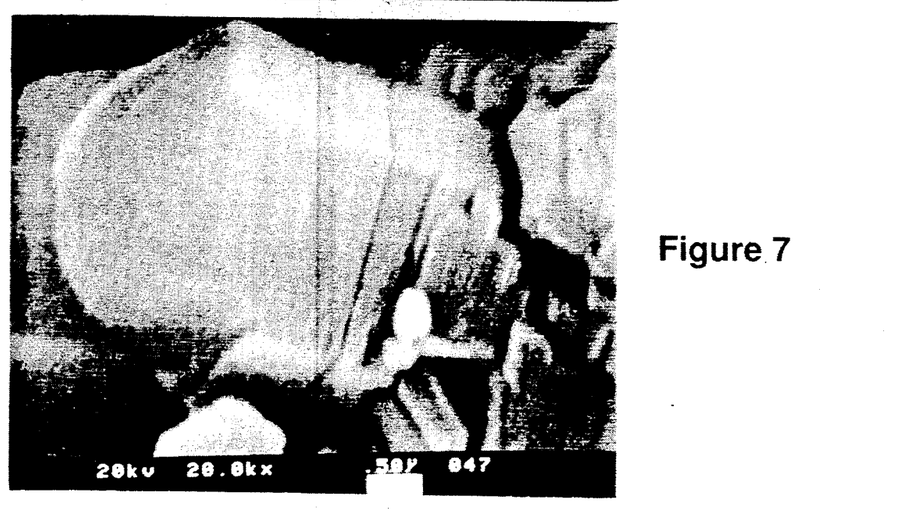

FIGS. 6 and 7 are scanning electromicrographs of the products calcined at 1050° C. from Runs 1 and 2, respectively. It can be seen that the calcined material from the precipitation in the presence of the alpha alumina promoter (FIG. 6) shows a smaller crystallite size, even though the particle size is not significantly changed. The smaller crystallite size allows the product to be ground finer, and thus green bodies formed from the ground product can be sintered at lower temperatures.

EXAMPLE XXXIV

The effect of precipitation temperature and presence of promoter material on the translucence of the final product is shown as follows. Translucence is evaluated by the optical transmission of white light in a brightness meter.

Run 1- Aluminum hydrate is prepared by reacting 1000 g high purity aluminum metal in 10 liters of 1.4 M choline at 50° C. 20 g/l finely ground alpha alumina promoter (d90-1.66μ, d50-0.54μ, d10-0.33μ) is added to the reaction mixture as the hydrate is precipitating. The precipitate is collected and calcined for two hours at 1250° C. The resulting product shows a particle size distribution of d90- 1.31μ, d50- 0.62 μ, and d10- 0.35μ, and a translucence (absorbance) value of 12.

Run 2 is identical to Run 1 except no promoter material is added during precipitation. The resulting material shows a particle size distribution of d90- 0.91μ, d50- 0.48μ and d10- 0.35μ, and a translucence value of 17.

Run 3 is identical to Run 2, except the precipitation temperature is 75° C. The resulting product shows a particle size distribution of d90- 1.33μ, d50- 0.53μ and d10- 0.31μ, and a translucence value of 26.

TABLE I

| | | Choline-Al—H₂O Reaction | | | | |
|---|---|---|---|---|---|---|
| Example | Experiment | Choline Concentration (M)* | Temperature °C. | Metal Surface Area (mm²/gram) | Reaction Time, Hr. | Wt. Al Reacted, grams |
| I | HPA-CHV1 | 0.05 | 81-86 | 250,000** | 3.83 | 40.5 |
| II | HPA-CHV2 | 0.05 | 78-89 | 250,000** | 3.70 | 101.0 |
| III | HPA-CHV3 | 0.05 | 54-67 | 250,000** | 4.92 | 40.5 |
| IV | HPA-CHV4 | 0.05 | 55-65 | 250,000** | 5.50 | 101.0 |

*mols/liter
**Alcoa 7123 Powder. average particle size = 17 microns.

TABLE II

| | | Choline-Al—H₂O Reaction | | | | |
|---|---|---|---|---|---|---|
| Example | Experiment | Choline Concentration (M)* | Temperature °C. | Metal Surface Area (mm²/gram) | Reaction Time, Hr. | Wt. Al Reacted, grams |
| V | HPA-DS1 | 0.25 | 75 | 50,000 | 3.66 | 55.5 |
| VI | HPA-DS2 | 0.125 | 74-77 | 50,000 | 5.58 | 45.6 |
| VII | HPA-DS3 | 0.25 | 71-77 | 50,000 | 5.00 | 101.0 |
| VIII | HPA-DS12 | 0.25 | 73-75 | 1,400 | 4.50 | 73.0 |

*mols/liter

TABLE III

| | | Choline-Al—H₂O Reaction | | | | | |
|---|---|---|---|---|---|---|---|
| | | Choline Concentration | Temperature | Metal Surface Area | Reaction | Wt. Al | |
| Example | Experiment | (M)* | °C. | (mm²/gram) | Time. Hr. | Initial | Reacted, grams |
| IX | 21804-37 | 0.05 | 75 | 190 | 33.0 | 5.0 | 0.31 |
| IXA | 22660-15 | 0.05 | 75 | 335 | 6.5 | 25.1 | 2.56 |
| X | 21886-4 | 0.125 | 60 | 190 | 30.4 | 131.5 | 42.4 |
| XI | 21886-6 | 0.50 | 60 | 190 | 24.0 | 121.6 | 52.11 |
| XII | 21886-8 | 0.125 | 60 | 190 | 4.0 | 122.8 | 5.6 |
| XIII | 21804-48B | 0.50 | 45 | 190 | 24.0 | 25.2 | 3.18 |

*mols/liter

TABLE IIIA

Aluminum Reaction with Choline-Water Solutions at 60° C.
Effect of Methanol on Reaction Rates

| Example | Experiment | Choline Concentration (M)** | Reactor | Methanol Concentration (M)** | Initial Al Metal Wt (gm) | Metal Surface Area (mm)²/gm | Weight Al Reacted (gm) | Reaction Time (hrs) | Weight Al(OH)₃ Recovered (gm) | Reaction Rate* |
|---|---|---|---|---|---|---|---|---|---|---|
| XIV | 22523-12 | 0.125 | 1 | Nil | 20.93 | 190 | 4.35 | 30.07 | 13.53 | 1.45 |
| XV | 22523-13 | 0.125 | 1 | Nil | 20.02 | 190 | 3.01 | 25.03 | 9.54 | 1.26 |
| XVI | 22523-15 | 0.125 | 1 | 0.58 | 20.81 | 190 | 8.21 | 28.58 | 22.27 | 2.80 |
| XVII | 21886-27 | 0.25 | 2 | 1.15 | 129.29 | 190 | 73.01 | 27.0 | 215.21 | 4.08 |
| XVIII | 22523-4 | 0.25 | 1 | Nil | 18.45 | 190 | 3.07 | 6.33 | 5.39 | 4.16 |
| XIX | 21886-26 | 0.50 | 2 | 2.31 | 131.86 | 190 | 66.19 | 24.25 | 176.84 | 4.04 |
| XX | ·22253-9 | 0.50 | 1 | Nil | 20.72 | 190 | 3.43 | 6.20 | 6.39 | 5.38 |
| XXI | 21632-37 | 0.50 | 1 | 2.31 | 25.17 | 190 | 12.59 | 24.0 | 33.1 | 5.15 |
| XXII | 22523-8 | 0.59 | 1 | Nil | 22.05 | 190 | 4.27 | 6.67 | 4.75 | 5.85 |
| XXIII | 21886-35 | 1.0 | 1 | 4.62 | 22.99 | 190 | 13.61 | 25.17 | 37.4 | 4.33 |
| XXIV | 21886-28 | 1.0 | 2 | 4.62 | 133.66 | 190 | 76.45 | 26.92 | 211.07 | 4.14 |
| XXV | 21886-48 | 1.5 | 1 | 6.93 | 22.58 | 190 | 7.27 | 7.42 | 15.49 | 8.37 |
| XXVI | 21886-39 | 2.0 | 1 | 9.24 | 21.83 | 190 | 6.82 | 29.58 | 13.98 | 2.08 |

*$\frac{\text{gram moles Aluminum reacted}}{(\text{m}^2 \text{ Al}) \text{ hr}}$

**mols/liter

Reactor Type
1 = Magnetically stirred culture flask
2 = Mechanically stirred reactor

TABLE IIIB

Aluminum Reaction with Choline-Water Solutions at 75° C.

| Example | Experiment | Choline Concentration (M)** | Methanol Concentration (M)** | Initial Al Metal Wt (gm) | Metal Surface Area (mm)²/gm | Weight Al Reacted (gm) | Reaction Time (hrs) | Weight Al(OH)₃ Recovered (gm) | Reaction Rate* (m² Al) hr |
|---|---|---|---|---|---|---|---|---|---|
| XXVII | 22660-3 | 0.05 | 0.23 | 20.23 | 544 | 4.27 | 27.5 | 9.93 | 0.52 |
| XXVIII | 21804-11 | 0.125 | 0.58 | 25.96 | 190 | 4.12 | 3.78 | 8.92 | 6.39 |
| XXIX | 21804-15 | 0.125 | 0.58 | 25.69 | 190 | 6.07 | 5.11 | 15.00 | 7.24 |
| XXX | 21804-1 | 0.50 | 2.31 | 25.22 | 190 | 16.87 | 20.5 | 47.75 | 8.91 |
| XXXI | 21804-13 | 0.50 | 2.31 | 24.99 | 190 | 4.81 | 5.33 | 9.65 | 7.97 |
| XXXII | 21804-42 | 2.0 | 9.24 | 20.05 | 190 | 6.59 | 25.0 | 12.67 | 2.59 |

*$\frac{\text{gram moles Aluminum reacted}}{(\text{m}^2 \text{ Al}) \text{ hr}}$

**mols/liter

TABLE IV

Choline-Al—H₂O Reaction

| Example | Aluminum Hydroxide Phase(s) |
|---|---|
| I | Bayerite (Major), Boehmite (Minor) |
| II | Bayerite (Major), Boehmite (Minor) |
| III | Bayerite (Major), Boehmite (Minor) |
| IV | Bayerite (Major), Boehmite (Minor) |

TABLE V

Choline-Al—H₂O Reaction

| Example | Wt. of Aluminum Hydroxide Recovered | Aluminum Hydroxide Phase(s) |
|---|---|---|
| V | — | Gibbsite (Major), Nordstrandite (Major) |
| VI | — | Gibbsite (Major), Nordstrandite (Major), Bayerite (Major) |
| VII | — | Gibbsite (Major), Nordstrandite (Major), |
| VIII | 294.17 | Bayerite (Major) |

TABLE VI

Choline-Al—H₂O Reaction

| Example | Wt. of Aluminum Hydroxide Recovered | Aluminum Hydroxide Phase(s) |
|---|---|---|
| IX | 0.67 | Bayerite, Minor Nordstrandite, amorphous |
| IXA | 6.34 | Bayerite, Nordstrandite |
| X | 116.08 | All Gibbsite |
| XI | 134.36 | All Gibbsite |
| XII | — | All Gibbsite |
| XIII | 5.61 | All Gibbsite |

TABLE VII

SURFACE AREAS AND PORE VOLUMES OF STARTING ALUMINUM HYDROXIDES

| Sample Number | Sample Origin | Surface Area M²/gm. Nitrogen BET | Average Pore Diameter Å (BET 4V/4) | Pore Volume cc/gm |
|---|---|---|---|---|
| M 3245 | Alcoa C331 Ground Bayer Al(OH)₃ | 0.24 | 100.8 | 0.00060 |
| 22523-26 | Al(OH)₃ From 0.25 M Choline | 1.58 | 175.8 | 0.0069 |
| HPA-CH5 | Al(OH)₃ From 0.056 M Choline | 51.9 | 115.8 | 0.15 |
| 21886-45 | Al(OH)₃ From 2.0 M Choline, 75° C., 28 hr rx | 9.36 | 182.2 | 0.0426 |
| 21886-47 | Al(OH)₃ From 2.0 M choline, 75° C., 6.3 hr rx | 32.2 | 227.1 | 0.183 |

TABLE VII-continued

SURFACE AREAS AND PORE VOLUMES OF STARTING ALUMINUM HYDROXIDES

| Sample Number | Sample Origin | Surface Area $M^2/gm.$ Nitrogen BET | Average Pore Diameter Å (BET 4V/4) | Pore Volume cc/gm |
| --- | --- | --- | --- | --- |
| 21886-48 | Al(OH)$_3$ From 1.5 M choline, 60° C., 7.4 hr rx | 21.1 | 280.4 | 0.148 |

TABLE VIII

SURFACE AREA AND AVERAGE PORE DIAMETER CALCINED Al(OH)$_3$ - CHOLINE PROCESS VS. BAYER Al(OH)$_3$

| Sample Number | Al(OH)$_3$ Type (Starting Material) | Al(OH)$_3$ Sample No. | Calcination Temp. °C. | Surface Area $M^2/gm$ $N_2$ BET | Average Pore Diameter, Å, BET $\frac{4V}{A}$ | Pore Volume $cm^3/gm$ |
| --- | --- | --- | --- | --- | --- | --- |
| 23580-3-1 | From 1.5M Choline-Al | 21886-48 | 400 | 460.8 | 36.5 | 0.420 |
| 23580-3-2 | From 1.5M Choline-Al | 21886-48 | 500 | 383.3 | 45.2 | 0.433 |
| 23580-3-3 | From 1.5M Choline-Al | 21886-48 | 600 | 300.3 | 61.2 | 0.460 |
| 23580-3-4 | From 1.5M Choline-Al | 21886-48 | 800 | 188.9 | 102.1 | 0.482 |
| 23580-5-1 | C331 Ground Bayer Al(OH)$_3$ | M3245 | 400 | 354.0 | 21.6 | 0.192 |
| 23580-5-2 | C331 Ground Bayer Al(OH)$_3$ | M3245 | 500 | 309.6 | 28.4 | 0.220 |
| 23580-5-3 | C331 Ground Bayer Al(OH)$_3$ | M3245 | 600 | 219.5 | 42.9 | 0.235 |
| 23580-5-4 | C331 Ground Bayer Al(OH)$_3$ | M3245 | 800 | 156.9 | 59.4 | 0.233 |

TABLE IX

SURFACE AREAS OF ALUMINAS PREPARED BY CALCINING ALUMINAS FROM THE CHOLINE PROCESS (U.S. Pat. No. 887,000)

| Sample Number | Al(OH)$_3$ Type Al(OH)$_3$ From 0.25 M Choline, 60° C. | Calcination Temperature, °C. | Surface Area $M^2/gm$ ($N_2$ BET) | Average Pore Diameter, Å (BET $\frac{4V}{A}$) | Pore Volume $cm^3/gm$ |
| --- | --- | --- | --- | --- | --- |
| 23127-50-1 | 22523-26 | 400 | 389.7 | 20.6 | 0.200 |
| 23127-50-2 |  | 500 | 334.5 | 25.9 | 0.217 |
| 23127-50-3 |  | 600 | 248.8 | 37.1 | 0.231 |
| 23127-50-4 |  | 800 | 168.6 | 55.2 | 0.233 |
| LSN 535328* | Bayerlite* CC2037 | 375 | 384 | — | — |
| LSN 535331 |  | 380 | 360 | — | — |
| 21886-45-30 | 2.0M Choline, 28 hr rx, 75° C. | 400 | 389.0 | 30.0 | 0.292 |
| 21886-45-30A | 2.0M Choline, 28 hr rx, 75° C. | 600 | 264.8 | 51.0 | 0.338 |
| 21886-47-30 | 2.0M Choline, 6.3 hr, 75° C. | 400 | 395.7 | 45.4 | 0.499 |
| 21886-47-30A | 2.0M Choline, 6.3 hr, 75° C. | 600 | 268.0 | 71.8 | 0.481 |
| HPA-CH5-30 | 0.056M Choline, 75° C. | 400 | 345.0 | 40.9 | 0.353 |
| HPA-CH5-30A | 0.056M Choline, 75° C. | 600 | 241.4 | 63.2 | 0.382 |

*Bayerlite produced by the action of choline (0.05M) thenammonia (aqueous) and acetic acid on a fine aluminum metal powder (see notebook 22331, p. 8 from M. L. Weaver, Chemical Systems Division, Alcoa Laboratories.)

TABLE X

PHASES PRESENT IN ALUMINAS PRODUCED FORM Al(OH)$_3$ FROM THE PROCESS OF U. S. APPLICATION 887,000 COMPARED WITH BAYER Al(OH)$_3$

| Sample Number | Aluminum Hydroxide Origin | Activation Temperature, °C. | Phases Found |
| --- | --- | --- | --- |
| 23580-3-1 | 21886-48 From Al + 1.5 M Choline | 400 | Gamma/chi, trace delta (?), trace boehmite (2) |
| 23580-3-2 | 21886-48 From Al + 1.5 M Choline | 500 | Gamma/chi |
| 23580-3-3 | 21886-48 From Al + 1.5 M Choline | 600 | Gamma/chi, trace delta (?) |
| 23580-3-4 | 21886-48 From Al + 1.5 M Choline | 800 | Gamma/chi |
| 23580-5-1 | M3245, C331 Ground Bayer Al(OH)$_3$ | 400 | Major boehmite, major gamma/chi |
| 23580-5-2 | M3245, C331 Ground Bayer Al(OH)$_3$ | 500 | Major gamma/chi, trace boehmite |
| 23580-5-3 | M3245, C331 Ground Bayer Al(OH)$_3$ | 600 | Gamma/chi |
| 23580-5-4 | M3245, C331 Ground Bayer Al(OH)$_3$ | 800 | Gamma/chi |
| 23127-50-1[2] | Al(OH)$_3$ From Aluminum Reaction With 0.25M Choline At 60° C. (22523-26) | 400 | Major boehmite, major chi alumina |
| 23127-50-2[2] | Al(OH)$_3$ From Aluminum Reaction With 0.25M Choline At 60° C. (22523-26) | 500 | Major gamma/chi alumina |
| 23127-50-3[2] | Al(OH)$_3$ From Aluminum Reaction With 0.25M Choline At 60° C. (22523-26) | 600 | Major gamma/chi alumina |
| 23127-50-4[2] | Al(OH)$_3$ From Aluminum Reaction With 0.25M Choline At 60° C. (22523-26) | 800 | Major gamma/chi alumina |

[1]Analytical Chemistry Division J.O. 88-040706
[2]Analytical Chemistry Division J.O. 88-051215

TABLE XI

| | | Calcining Al(OH)₃ From Choline Process | | | | |
|---|---|---|---|---|---|---|
| | Al(OH)₃ | Al(OH)₃ | Calcination | | Surface Area | Alpha |
| Experiment | Sample No. | Phase | Time (hr) | Temp °C. | m²/g by N₂ BET | Alumina. % |
| 1020G-1 | 21886-4 | Gibbsite | 4 | 1100 | 15 | 92 |
| 1020G-1 | 21886-4 | Gibbsite | 2 | 1150 | 9 | 106 |
| 1021G-1 | 21886-6 | Gibbsite | 4 | 1100 | 9 | 95 |
| 1021G-2 | 21886-6 | Gibbsite | 2 | 1150 | 7 | 106 |

It will be understood that the above description of the present invention is susceptible to various modifications, changes and adaptations and the same are intended to be comprehended within the meaning and range of equivalents of the appended claims.

What is claimed is:

1. A method for the production of aluminum hydroxide, comprising reacting water in the liquid phase and aluminum, the reaction being carried out in the presence of an alpha alumina promoter material, and collecting solid material from the reaction mixture.

2. The method of claim 1, wherein the reaction is carried out in the presence of choline at a concentration of about 0.5 to 2 M.

3. The method of claim 1, wherein the reaction is carried out at a temperature in the range of about 40° C. to 70° C.

4. The method of claim 3, wherein the temperature is about 50° C.

5. The method of claim 1, wherein the promoter material is present in an amount of about 0.01–10% by weight based on the amount of equivalent alpha alumina in the precipitate obtained.

6. A method for the production of alpha alumina, comprising calcining aluminum hydroxide obtained from the process of claim 1, 7. The method of claim 6, wherein the calcination is carried out at a temperature less than 1100° C.

8. The method of claim 7, wherein the temperature is about 1050° C.

9. Aluminum hydroxide particles formed of a plurality of randomly-oriented platelets constituting a sponge-like morphology having openings in the range of about 0.1 to 2.5μ and being substantially free from sodium.

10. Aluminum hydroxide particles exhibiting a Bayerite-type or Gibbsite-type x-ray diffraction pattern and having a surface area of at least about 1.5 m²/gm, the particles having a size of at least about 1μ, the particles being substantially free from heavy metals and containing sodium in an amount less than about 0.01% by weight.

11. Aluminum hydroxide particles as claimed in claim 10, wherein the surface area is at least about 5 m²/gm.

12. Aluminum hydroxide particles as claimed in claim 10, wherein the amount of sodium is less than about 0.001% by weight.

13. Aluminum hydroxide particles exhibiting a Gibbsite-type x-ray diffraction pattern and containing sodium in an amount less than about 0.01% by weight.

14. Aluminum hydroxide particles as claimed in claim 13, wherein the amount of sodium is less than about 0.001% by weight.

* * * * *

UNITED STATES PATENT AND TRADEMARK OFFICE
CERTIFICATE OF CORRECTION

PATENT NO. : 5,225,229
DATED : July 6, 1993
INVENTOR(S) : Martin et al.

It is certified that error appears in the above-indentified patent and that said Letters Patent is hereby corrected as shown below:

On the title page, item (56):

| | |
|---|---|
| Other Publications Line 13 | Change "Lussy" to --Lussky--. |
| Other Publications Line 20 | Change "Edward" to --Edwards--. |
| Col. 6, line 60 | Change "XX-III" to --X-XIII--. |
| Col. 11, Table IIIA | Change column heading "Reactor (gm)" to --Reactor Type--. |
| Col. 14, Table IX | Change in Heading "U.S. Patent No." to --U.S. Serial No.--. |
| Col. 14, Table IX | In the last column change "0.499" to --0.449--. |

UNITED STATES PATENT AND TRADEMARK OFFICE
CERTIFICATE OF CORRECTION

PATENT NO. : 5,225,229
DATED : July 6, 1993
INVENTOR(S) : Edward S. Martin, et al.

It is certified that error appears in the above-indentified patent and that said Letters Patent is hereby corrected as shown below:

Col. 14, Table X, in the title, line 1, change "form" to --from--.

Signed and Sealed this

Fifth Day of April, 1994

Attest:

BRUCE LEHMAN

*Attesting Officer*     *Commissioner of Patents and Trademarks*